United States Patent [19]
Goodbary

[11] 3,885,643
[45] May 27, 1975

[54] ELEVATABLE CAB FOR VEHICLES
[75] Inventor: Edgar R. Goodbary, Tulsa, Okla.
[73] Assignee: Unit Rig & Equipment Co., Tulsa, Okla.
[22] Filed: July 31, 1970
[21] Appl. No.: 59,903

[52] U.S. Cl. .............................. 180/89 R; 296/28 C
[51] Int. Cl. ............................................. B62d 33/06
[58] Field of Search ........... 296/28 C, 28 A, 28 AL; 180/89 R, 77 S; 214/392

[56] References Cited
UNITED STATES PATENTS

| | | | |
|---|---|---|---|
| 2,778,674 | 1/1957 | Attendu | 296/28 A |
| 3,123,380 | 3/1964 | Grim et al. | 296/28 C |
| 3,391,811 | 7/1968 | Barnes | 180/89 X |
| 3,396,861 | 8/1968 | Houlton | 214/392 |

FOREIGN PATENTS OR APPLICATIONS

| | | | |
|---|---|---|---|
| 1,217,802 | 5/1966 | Germany | 180/89 |
| 1,053,031 | 12/1966 | United Kingdom | 180/89 |

Primary Examiner—David Schonberg
Assistant Examiner—John A. Pekar
Attorney, Agent, or Firm—William S. Dorman

[57] ABSTRACT

An elevatable cab structure for vehicles of relatively low overall height such as vehicles for towing extremely large aircraft. The vehicle cab is particularly designed and constructed for being lowered for facilitating passage of the vehicle beneath the aircraft and into the towing position with respect thereto and being elevated or moved to a raised position during a towing operation.

1 Claim, 10 Drawing Figures

INVENTOR
EDGAR R. GOODBARY

BY
William S. Dorman
ATTORNEY

INVENTOR.
EDGAR R. GOODBARY
BY
William S. Dorman

ELEVATABLE CAB FOR VEHICLES

This invention relates to improvements in vehicles and more particularly, but not by way of limitation, to an elevatable cab structure for a vehicle of a minimum overall height.

Extremely large aircraft being constructed today presents problems on the ground in an air terminal in that movement of the aircraft on the ground is very difficult. For example, transporting of the aircraft to a hangar or any other position at the air terminal other than the actual take-off or landing procedure is hampered by the size and weight of the aircraft and the fact that use of the jet aircraft engines for such movements is impractical. As a result, tow vehicles have been designed for moving or pulling the aircraft from one position to another on the ground, such as that shown in copending application Ser. No. 842,467, filed July 17, 1969, now abandoned entitled "Vehicle Wheel Suspension and Mounting Means" and of which I am a co-inventor. The overall height of these tow vehicles must be maintained at a minimum, for example 5 feet, in order that the vehicle may be driven under the aircraft and into the towing position with respect thereto. Subsequent to connecting of the tow vehicle with the aircraft the vehicle is operated for pulling the aircraft to the desired location. The low elevation of the vehicle cab hampers the vision of the driver or operator of the vehicle and may create hazardous circumstances.

The present invention contemplates a novel elevatable cab structure for an aircraft tow vehicle which overcomes the foregoing disadvantages. During the connection of the tow vehicle with the aircraft the cab may be lowered for facilitating the movement of the vehicle beneath the structure of the aircraft. When the towing operation is to be commenced, the cab may be elevated in order that the driver will be able to view or see around or over certain obstructing portions on the aircraft being towed. A track and rail type connection is provided between the vehicle itself and the cab structure or cab portion. Electrical, hydraulic, pneumatic or other suitable means may be utilized for elevating the cab with respect to the vehicle portion. The cab portion may be raised and lowered at will to facilitate the overall efficiency of the tow vehicle operation.

It is an important object of this invention to provide a tow vehicle for aircraft, particularly designed and constructed for efficiently towing large aircraft.

Another object of this invention is to provide a tow vehicle for large aircraft wherein the cab portion may be alternately raised and lowered for facilitating the towing of large aircraft.

Still another object of this invention is to provide an elevatable cab structure for vehicles of a minimum overall height for facilitating the vision of the driver of the vehicle during operation thereof.

Other and further objects and advantageous features of the present invention will hereinafter more fully appear in connection with a detailed description of the drawings in which.

Figure 8:
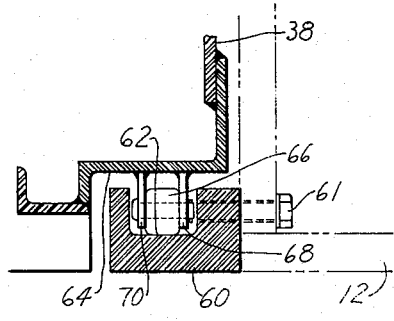
Figure 9:
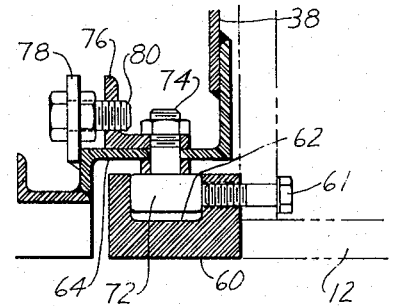
Figure 10:
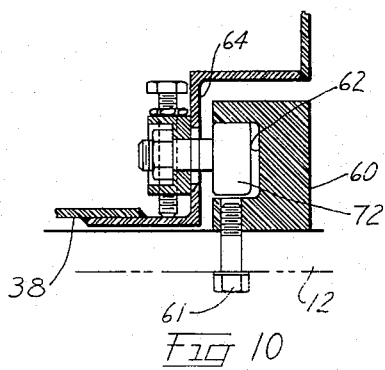
Figure 6:
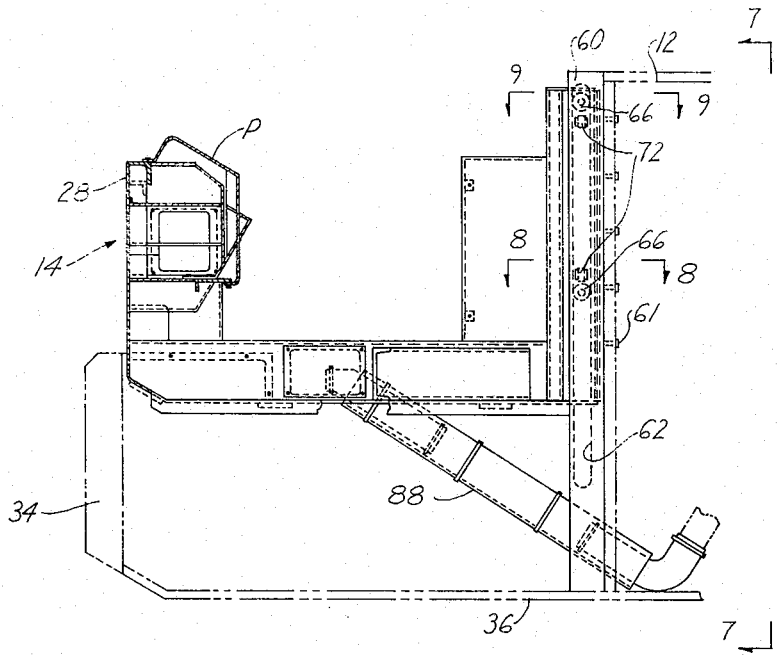
FIG. 6 is a side elevational view of the cab platform in an elevated position with portions shown in dotted lines for purposes of illustration.
Figure 7:
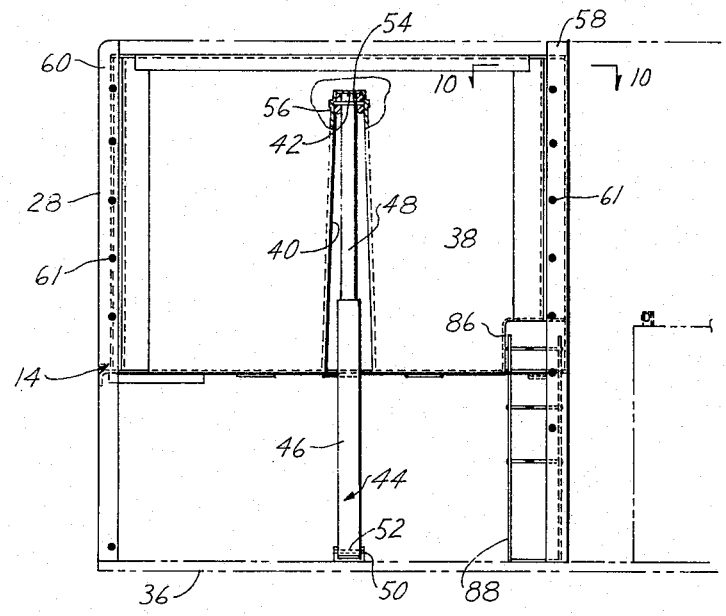

FIG. 7 is a view taken on line 7—7 of FIG. 6.
FIG. 8 is a view taken on line 8—8 of FIG. 6.
FIG. 9 is a view taken on line 9—9 of FIG. 6.
FIG. 10 is a view taken on line 10—10 of FIG. 7.

Figure 2:
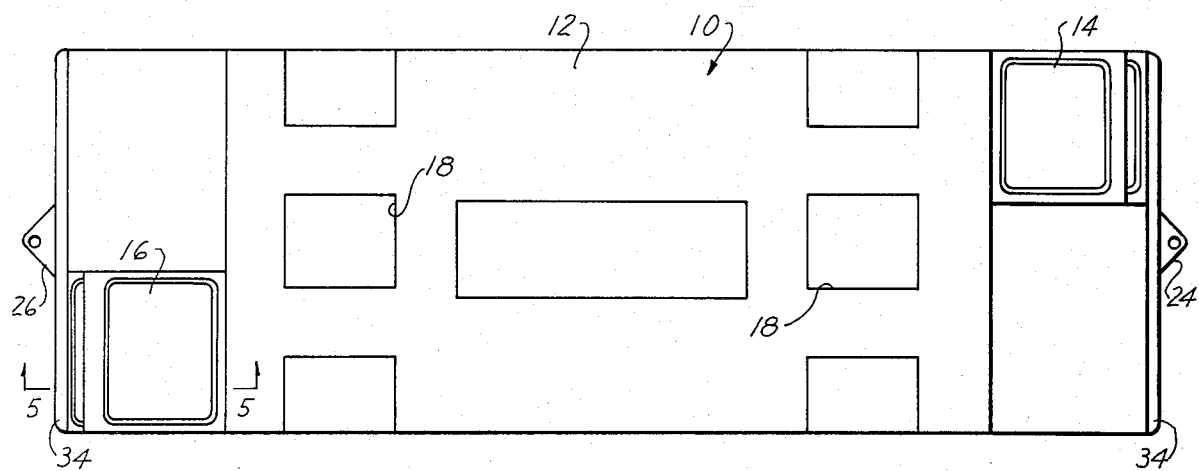
FIG. 2 is a plan view of a tow vehicle embodying the invention.
Figure 3:
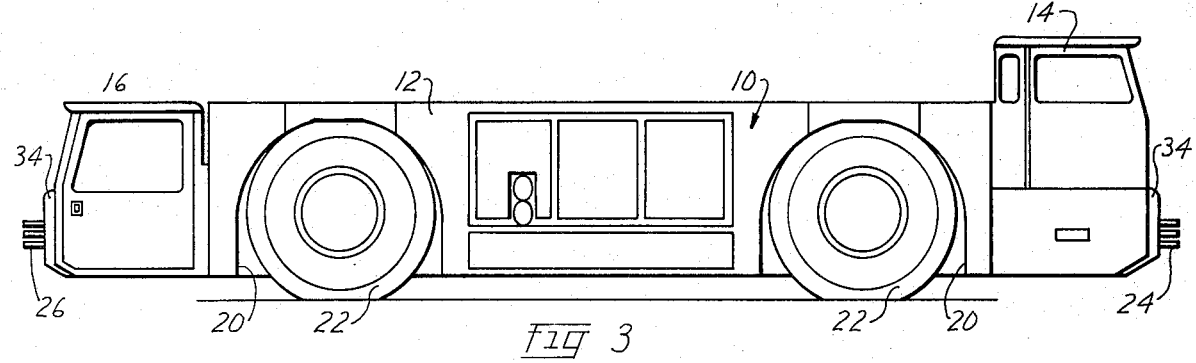
FIG. 3 is a view similar to FIG. 1 depicting one cab member in an elevated position.
Figure 4:
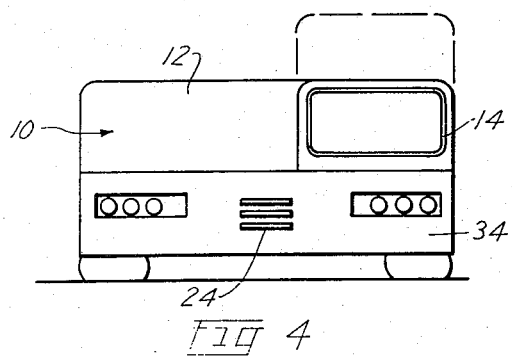
FIG. 4 is a front elevational view of a vehicle embodying the invention with the cab portion depicted in the lowered position in solid lines and in the elevated position in dotted lines.
Figure 5:
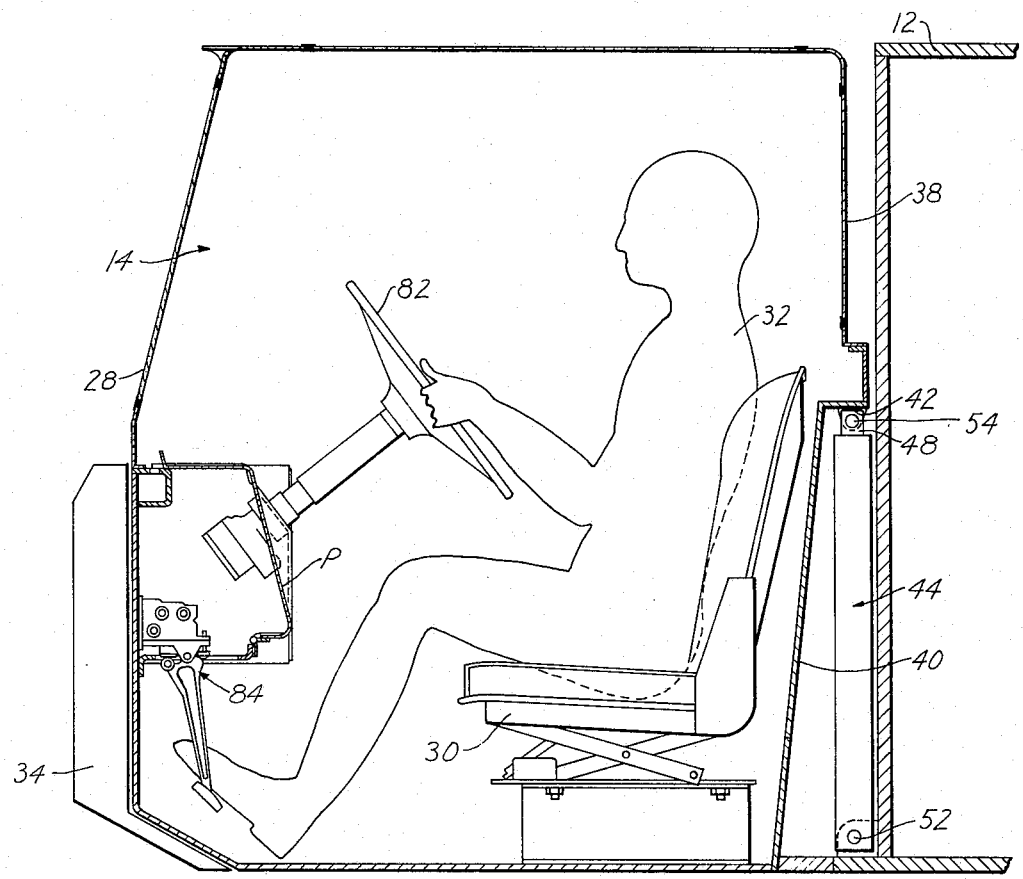
FIG. 5 is a sectional elevational view of a cab structure embodying the invention and depicting a cab operator or vehicle driver therein.

Referring to the drawings in detail, reference character 10 generally indicates a tow vehicle particularly designed for towing large aircraft and comprises a central body portion 12 having substantially identical cab sections 14 and 16 provided at the opposite ends thereof whereby the vehicle 10 may be driven from either end or direction thereof with equal ease. As particularly shown in FIG. 4 the cab sections 14 and 16 are each preferably positioned to one side of the vehicle, and more preferably on opposite sides thereof as shown in FIG. 2, to facilitate visibility in the rearward direction with respect to the respective cab. Each cab 14 and 16 is provided with all of the necessary steering equipment, shift lever device, and the like whereby full control is provided from either cab section independently of the other. A suitable engine or power plant (not shown), engine accessories (not shown), hydraulic tanks (not shown), fuel tanks (not shown), and the like as required for a completely operable vehicle are mounted on the body portion 12. In addition, a plurality of ballast compartments 18 are provided in the body 12 in order that the weight of the vehicle 10 may be increased or decreased in accordance with the operating requirements therefor. Wheel wells 20 are provided in the body portion 12 for housing the vehicle wheels 22 in a manner as set forth in the aforementioned copending application. It is preferable to provide four of the wheel wells 20 and respective wheels 22 with two wheels 22 and wheel wells 20 being provided on one side of the body 12 in longitudinally spaced relations as is well known, and two wheels 22 and wheel wells 20 being provided on the opposite side of the body 12 in substantial alignment with the wheels on the first side. Each wheel 22 is independently mounted within its respective wheel well 20 in a manner providing universal movement for each wheel 22 with respect to the body 12. In addition, substantially identical connecting means 24 and 26 are provided at the oppposite ends of the vehicle 10 for connecting with the aircraft (not shown) in any well known or suitable manner.

The cab sections 14 and 16 are substantially identical in construction and only the cab section 14 will be set forth in detail herein.

The cab section 14 comprises the usual outer housing portion 28 having at least one seat 30 mounted therein for supporting the driver or operator 32 of the vehicle 10. Of course, dual seats mounted in side-by-side relation within the housing 28 may be provided, if desired. The housing 28 is movably mounted between the body portion 12 and a transversely extending bumper 34 which is suitably secured to the vehicle 10 and remains stationary with the body portion 12. The connector member 24 is secured to the bumper 34 in any well known manner. The housing 28 preferably rests on platform 36 in the lowermost position thereof, and the platform 36 may be rigidly secured to the body portion 12 in any well known manner (not shown).

The housing 28 is provided with a back wall 38 spaced from the body portion 12, and having at least one recess portion 40 therein having a substantially horizontally disposed support shoulder 42 provided at the upper end thereof. A suitable hydraulic or pneumatic cylinder 44, or the like, is disposed in the recess 40 and comprises the usual outer housing 46 and reciprocal piston rod 48. The cylinder 44 may be anchored to the platform 36 in any suitable manner and as shown herein the housing 46 is disposed in a U-shaped bracket 50 and anchored therein by a pin 52. The outer end of the rod 48 is similarly anchored to the shoulder 42 by an anchor pin 54 and spaced downwardly extending flanges 56. Thus, the cylinder 44 is anchored between the stationary platform 36 and the movable cab housing 28 for a purpose as will be hereinafter set forth. Of course, whereas one centrally disposed recess 40 is shown herein, it is to be noted that a plurality of the recesses 40 may be spaced on the wall 38 of the housing 28, if desired, with an independent cylinder 44 provided in each recess. In addition, the cylinder 44 is operably connected with a source of fluid for reciprocation of the piston rod 46 for transmitting vertical upward and downward movement to the housing 28 as will be hereinafter set forth.

A pair of substantially identical oppositely disposed track members 58 and 60 are secured to the body portion 12 in any well known manner, such as by a plurality of spaced bolts 61, and are spaced in the proximity of the opposite vertical edges of the back wall 38. Each track 58 and 60 is provided with a longitudinally extending recess 62 on the surface thereof in the proximity of the edges of the back wall 38. Each edge of the back wall 38 is provided with an angular recess 64 generally complementary to the configuration of the tracks or rails 58 and 60 to provide clearance therefor, as particularly shown in FIGS. 8, 9, and 10. A plurality of rollers or cam followers 66 are longitudinally spaced along each recess 64 and may be secured therein in any suitable manner. As shown herein each cam follower is the yoke type and the roller 66 is journalled between a pair of outwardly extending spaced brackets 68 and 70 which are welded or otherwise secured in the recess 64. The rollers 66 constantly bear against the inner surface of the groove 62. In addition, a plurality of roller or cam followers 72 are longitudinally spaced along each recess 64 and into threaded engagment with a bracket member 76. The bracket 76 may be adjustably secured adjacent the wall of the recess 64 in any suitable manner whereby the position of the roller or cam follower 72 may be adjusted in order that the roller will constantly bear against the sidewall of the recess 62. As shown in FIG. 9, the bracket 76 is secured to a plate 78 by means of a threaded stud 80, and the plate 78 is welded or otherwise secured to the interior of the housing 28. It will be apparent that rotation of the stud 80 will cause the bracket 76 to move toward and away from the plate 78 for adjusting the position of the cam follower 72.

The cab section 14 is also provided with the usual steering wheel 82 operably connected with the steering system (not shown) by suitable hydraulic lines (not shown), and the like for steering of the vehicle 10. Suitable braking means 84 is also provided in the cab section 14 and is operably connected with the braking system (not shown) by suitable hydraulic lines (not shown) and the like. It is preferable that all of the hydraulic lines, electrical cable, and the like (not shown) for the cab section 14 be extended into and through a common channel, such as the channel 86, and through a suitable hose and cable protector member 88 for protection of the lines which extend from the cab section 14 to the operation systems of the vehicle provided in the body portion 12. The outer end of the protector 88 is loosely or slidably disposed on the upper surface of the platform 36 and moves therealong as the housing 28 reciprocates with respect to the rails or tracks 58 and 60. As particularly shown in FIG. 7, the channel 86 and protector 88 are disposed at one side of the interior of the housing, but it is to be understood that the channel and protector may be positioned at any desired location.

As hereinbefore set forth, the cab section 16 is substantially identical with the cab section 14 and the vehicle 10 may be operated from either cab section in substantially the same manner.

Figure 1:
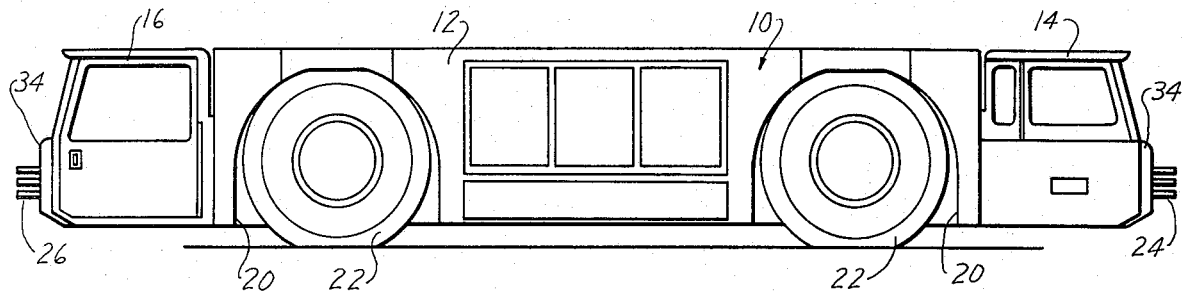
FIG. 1 is a side elevational view of a tow vehicle embodying the invention with the cab portions thereof depicted in a lowered position.

When the vehicle 10 is to be utilized for towing an aircraft, or the like (not shown), the operator or driver of the vehicle may select either of the cab sections 14 or 16 from which to operate or drive the vehicle. As hereinbefore set forth each of the cab sections is substantially identical and the vehicle may be complete operated from either end. The cab sections are preferably both disposed in the lowermost position therefor, as shown in FIG. 1, prior to the connection of the vehicle 10 with the aircraft to be towed. Since the overall height of the vehicle is maintained at a minimum, the vehicle may be easily driven and manuevered beneath the aircraft for connection therebetween. Either the connecting member 24 or 26 may be secured to the aircraft for the towing operation, as is well known, and depending upon which cab section is to be utilized as the driving component during the towing operation.

Subsequent to the connection of the vehicle 10 to the aircraft to be towed, and assuming that the operator of the vehicle has selected cab 14 as the driving unit therefor, it is usually desireable to elevate the cab section 14 prior to the initiation of the towing operation in order that the vision of the driver will not be hampered by the structure of the underneath sections of the aircraft. It is to be understood that substantially the entire vehicle 10 will be disposed beneath the aircraft when the vehicle 10 is connected therewith, and the towing operation is accomplished when the towing vehicle is in this position. it is important that the cab sections be in the lowermost position during the manuevering of the vehicle into the connection position with the vehicle in order that the vehicle will pass beneath the structural parts of the aircraft. However, in the towing position and during the towing operation, there is sufficient clearance for the elevated position of the driving unit cab.

In order to elevate the cab 14, the drive manipulates the proper switches or the like (not shown) on the panel P of the cab 14 for activating the hydraulic or pneumatic system (not shown) to direct the power fluid to the cylinder 44. The fluid is circulated to the cylinder housing 46 in such a manner as to move the rod 48 axially outward from the housing 46, as is well known. The rod 48 is connected with the shoulder 42 and upward or axially outward movement of the rod 48 moves the should 42 upwardly. This raises the housing 28 with respect to the vehicle body portion 12. Of course, as the housing 28 is elevated, the rollers 66 and 72 ride in the grooves 62 for guiding the movement of the housing and maintaining the movement thereof in a substantially straight and true vertical path. As shown herein, the upward movement of the housing 28 is limited by the engagement of the uppermost rollers with the upper closed end of the grooves 62. Of course, it will be apparent that other or additional stop means (not show) may be provided for limiting the upward movement of the housing 28, if desired.

The cab section 14 preferably remains in the elevated position thereof during the towing opertion. When the aircraft has been moved to the desired location, and it is no longer necessary to tow the aircraft, the vehicle 10 may be disconnected therefrom in the usual manner, as is well known. The cab section 14 may then be lowered to facilitate the manuevering of the towing vehicle from beneath the aircraft. In order to lower the cab 14, the driver manipulates the fluid system for circulating the fluid to the cylinder housing 46 in such a manner that the piston rod 48 is moved axially downward, thus moving the housing 28 downward with respect to the body portion 12. The downward movement of the housing 28 is limited by the engagement of the housing 28 with the platform 36. With the cab section 14 in the lowermost position, the vehicle 10 may be driven or moved away from the proximity of the aircraft, and may be driven or moved to the site of another towing operation, or to a storage position, or the like, as desired.

It will be apparent that the cab 16 may be lowered and raised in substantially the identical manner when the cab 16 is selected as the driving or controlling unit for the vehicle 10. It is to be understood that the vertical position of the cab sections 14 and 16 may be selected by the driver of the vehicle, within the upper and lower limits thereof, by his actuation of the fluid system for the elevating operation. The movement of the piston 48 with respect to the cylinder housing 46 determines the position of the cab with respect to the body portion 12.

From the foregoing it will be apparent that the present invention contemplates a novel elevatable cab for a towing vehicle wherein the vertical position of the cab may be adjusted in accordance with the most desirable position therefor during a particular operation of the vehicle. When the vehicle is being manuevered into a connecting position with an aircraft, or the like, which is to be towed, the cab section or sections is preferably disposed in the lowermost position thereof in order to maintain a minimum overall height for the vehicle. Subsequent to the connection of the vehicle with the aircraft, or prior to the initiation of the towing operation, the cab section being utilized as a driving unit may be elevated to a position sufficiently high with respect to the vehicle and aircraft under-structure for facilitating the vision of the driver of the towing vehicle during the towing operation.

Whereas the present invention has been described in particular relation to the drawings attached hereto, it should be understood that other and further modifications, apart from those shown or suggested herein, may be made within the spirit and scope of this invention.

What is claimed is:

1. In combination with a steerable vehicle having a substantially horizontal platform secured thereto, a cab section movably secured to the vehicle and disposed above the platform, the cab section comprising an outer housing having a substantially vertical backwall secured thereto and operator controls and control lines disposed therein, horizontal shoulder means provided on the upper portion of the vertical backwall, elongated power fluid piston means having one end thereof pivotally secured to the shoulder means and the opposite end being pivotally secured to the platform for transmitting reciprocal vertical movement to the cab section, vertically disposed track and roller means cooperating between the backwall of the cab section and the vehicle for guiding the vertical movement of the cab section and for providing cantilever support to the cab section when said cab section is raised above the platform, and including an elongated channel means pivotally secured at one end thereof to the lower portion of the cab section, the opposite end of said channel means being slidably disposed against the platform for the protection of the operator control lines extending from the cab section to the vehicle during the raising and lowering of the cab section.

* * * * *